US008416983B1

(12) United States Patent
Joseph

(10) Patent No.: US 8,416,983 B1
(45) Date of Patent: Apr. 9, 2013

(54) METHOD AND APPARATUS FOR ESTABLISHING AN ACCURATE LOW BIT TIME STAMP IN A REMOTELY CREATED WATERMARK

(75) Inventor: Kuriacose Joseph, Gaithersburg, MD (US)

(73) Assignee: The DIRECTV Group, Inc., El Segundo, CA (US)

( * ) Notice: Subject to any disclaimer, the term of this patent is extended or adjusted under 35 U.S.C. 154(b) by 518 days.

(21) Appl. No.: 12/766,811

(22) Filed: Apr. 23, 2010

(51) Int. Cl.
*G06K 9/00* (2006.01)

(52) U.S. Cl.
USPC .......... 382/100; 705/901; 705/902; 705/903; 705/904; 705/905; 705/906; 705/907; 705/908; 705/909; 705/910; 705/911; 705/912

(58) Field of Classification Search .................. None
See application file for complete search history.

(56) References Cited

U.S. PATENT DOCUMENTS

| 7,688,860 | B2 | 3/2010 | Konda et al. |
| 2003/0016825 | A1* | 1/2003 | Jones .......................... 380/210 |
| 2006/0271786 | A1 | 11/2006 | Konda et al. |
| 2007/0110237 | A1 | 5/2007 | Tehranchi et al. |
| 2007/0180235 | A1 | 8/2007 | Lelegard et al. |
| 2009/0070588 | A1* | 3/2009 | Staring .......................... 713/176 |
| 2009/0290711 | A1* | 11/2009 | Bloom et al. ................. 380/239 |

FOREIGN PATENT DOCUMENTS

WO 2009/156973 A1 12/2009

OTHER PUBLICATIONS

Kim, Hyoungshick; "Secure Scalable Streaming for Integrity Verification of Media Data"; Toward Network Innovation Beyond Evolution: The 9th International Conference on Advanced Communication Technology; ICACT 2007; Phoenix Park, Korea; Feb. 12-14, 2007; Proceedings, IEEE Technical Activities; Piscataway, New Jersey, USA; Feb. 1, 2007; pp. 516-520; XP031084848; ISBN: 978-89-5519-131-8, Section 3.
Lian, Shiguo; Liu, Zhongxuan; "Secure Media Content Distribution Based on the Improved Set-Top Box in IPTV"; IEEE Transactions on Consumer Electronics, IEEE Service Center; New York, NY, USA; vol. 54, No. 2; May 1, 2008; pp. 560-566; XP011229935; ISSN: 0098-3063, DOI: DOI:10.1109/TCE.2008.4560130.

\* cited by examiner

*Primary Examiner* — Claire X. Wang
*Assistant Examiner* — Thomas A James

(57) ABSTRACT

A method and apparatus for placing a time stamp in a remotely applied watermark is disclosed. The method permits a time stamp of high resolution to be added remotely while minimizing the number of bits necessary in the time stamp.

21 Claims, 10 Drawing Sheets

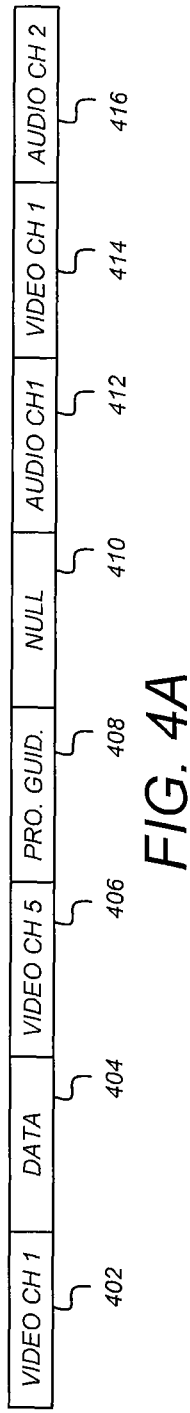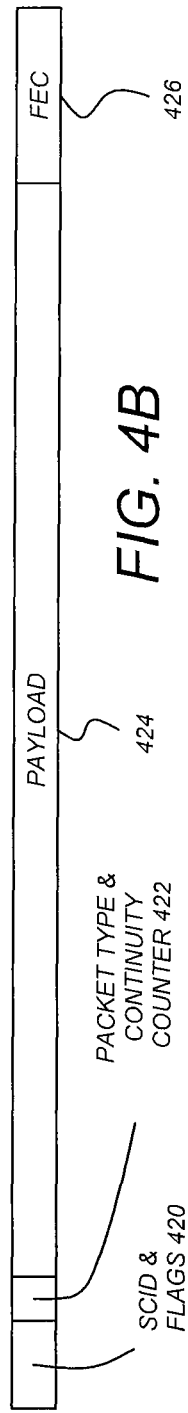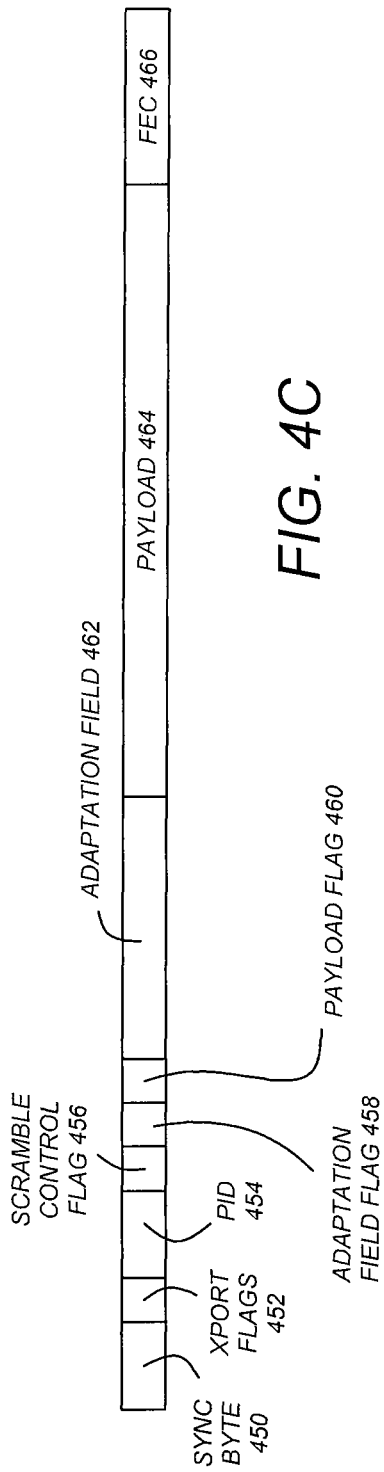

METHOD AND APPARATUS FOR ESTABLISHING AN ACCURATE LOW BIT TIME STAMP IN A REMOTELY CREATED WATERMARK

CROSS-REFERENCE TO RELATED APPLICATIONS

This application is related to the following co-pending and commonly assigned patent application(s), all of which applications are incorporated by reference herein:

Application Ser. No. 12/766,813 entitled "METHOD AND APPARATUS FOR REMOTELY INSERTING WATERMARK INTO ENCRYPTED COMPRESSED VIDEO BITSTREAM," filed on same date herewith, by Kuriacose Joseph, Raynold M. Kahn, Hanno Basse and Eugene Suharev.

BACKGROUND OF THE INVENTION

1. Field of the Invention

The present invention relates to systems and methods for watermarking media programs, and in particular to a system and method for remote watermarking of media programs.

2. Description of the Related Art

Media programs, which can include audio, video, or audio-visual works, can be transmitted and viewed by customers by a variety of means, including terrestrial or satellite broadcast, cable transmission, physical transmission of a recorded medium such as a digital versatile disk (DVD), flash drive, or hard drive.

Typically, such media programs are first released in theaters only. At some point, depending upon the media program and the characteristics of the theatrical release, the media program becomes no longer commercially viable as a theatrical release. At that point, it may then be made available as a secondary release as a DVD or on a pay-per-view (PPV) basis from a satellite or cable provider. Still later, typically after the market for the secondary release has been exhausted, the media program may enter general release. Upon general release, the media program may be presented in a general broadcast, so that customers can view them without paying additional fees. However, such media programs are typically unavailable as a secondary (non-theater) or general release until they have been under theatrical release only for a significant period of time.

One of the reasons for the tiered release of media programs is to maximize the revenue obtained from release of the media program. Those who are genuinely interested in viewing the media program will presumably do so during the theatrical release, while others who are less interested, or have less money or time, will generally view the media program during the secondary release. Those with even less interest or time may view the program upon its general release.

While the tiered release system increases revenue derived from the media program, such revenue can be further maximized by increasing viewership in the theatrical release, because the fee for viewing the media program is typically highest at this time. However, distribution is expensive and there are a limited number of theaters available for theatrical release. While it is possible to increase viewership in the theatrical release phase by providing the media program via remote transmission (for example, to the viewers' homes), the distributors of the media programs will not do so unless the copyrights to the media program are adequately protected.

At the same time, digital video recorders (DVRs) have become commonplace in many households. DVRs permit digital copies of media programs, including those provided on a PPV basis, to be made. DVRs may decode and display the video content or may transmit the content for decoding at a remote display device. Such copies do not degrade with subsequent copies, and are therefore of great concern to media program distributors, as they can be distributed in violation of the copyrights of the distributor.

Digital watermarking is a technique in which information can be added to media programs. Although the digital watermarks are invisible to the viewer of the media program, they can be processed to recover the information stored within, and this information can be used to confirm that the copy of the media program is unauthorized, identify where the copy came from, and when the copy was made. Such information can be used to identify and prosecute copyright infringers.

What is needed is a method and apparatus that allows protection of media programs displayed or stored at remote locations. Further, while the broadcaster or distributor can digitally watermark media programs before they are distributed, what is needed is a method and means for simply and inexpensively using customer equipment such as DVRs and integrated receiver/decoders (IRDs) or set-top boxes (STBs), to add watermark information that allows the identity of the DVR, IRD or STB that made an illegal copy and the date or time that the illegal copy was made to be determined. Further, this method and means must be compatible with the encryption schemes that are also used to protect the media program itself from copying while stored on the DVR and while transmitted to a remote display device. The present invention satisfies this need.

SUMMARY OF THE INVENTION

To address the requirements described above, the present invention discloses a method and apparatus for remotely time stamping a retrieved version of a media program and later recovering that time stamp to determine when the media program was time stamped. In one embodiment, the method comprises the steps of receiving a media program in a receiver remote from a headend, the media program having a first watermark including a time stamp describing a media program temporal datum to a first temporal resolution, storing the media program in the receiver, retrieving the stored media program, reading the first time stamp of the first watermark of the retrieved media program, computing a second time stamp from the temporal difference between a time at which the media program is retrieved from storage and the media program temporal datum, the second time stamp having a second temporal resolution greater than the first temporal resolution, generating a second watermark having the second time stamp, embedding the second watermark in the retrieved media program, and providing the media program and the embedded second watermark to a device external to the receiver.

In another embodiment, an apparatus comprises a receiver. The receiver includes a tuner for receiving a media program in a receiver remote from a headend disposed remotely from the receiver, the media program having a first watermark including a time stamp describing a media program temporal datum to a first temporal resolution, a video storage device for storing the media program in the receiver, for retrieving the stored media program, a watermark module, for reading the first time stamp of the first watermark of the retrieved media program, for computing a second time stamp from the temporal difference between a time that the stored media program is retrieved from storage and the media program temporal datum, the second time stamp having a second temporal resolution greater than the first temporal resolution, for generating a second watermark having the second time stamp, and for embedding the second watermark in the retrieved media program, and means for providing the media program and the embedded second watermark to a device external to the receiver.

BRIEF DESCRIPTION OF THE DRAWINGS

Referring now to the drawings in which like reference numbers represent corresponding parts throughout:

FIG. 4A is a diagram of a representative data stream;

FIG. 4B is a diagram of a data packet;

FIG. 4C is a diagram of an MPEG data packet;

FIG. 11 is another example of the resulting media program packets;

FIG. 12 is a diagram presenting exemplary method steps that can be used to recover the watermarked information in the media program stream; and FIG. 13 is a diagram illustrating an exemplary processor system that can be used to practice embodiments of the invention.

DETAILED DESCRIPTION OF PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Distribution System

Figure 1:
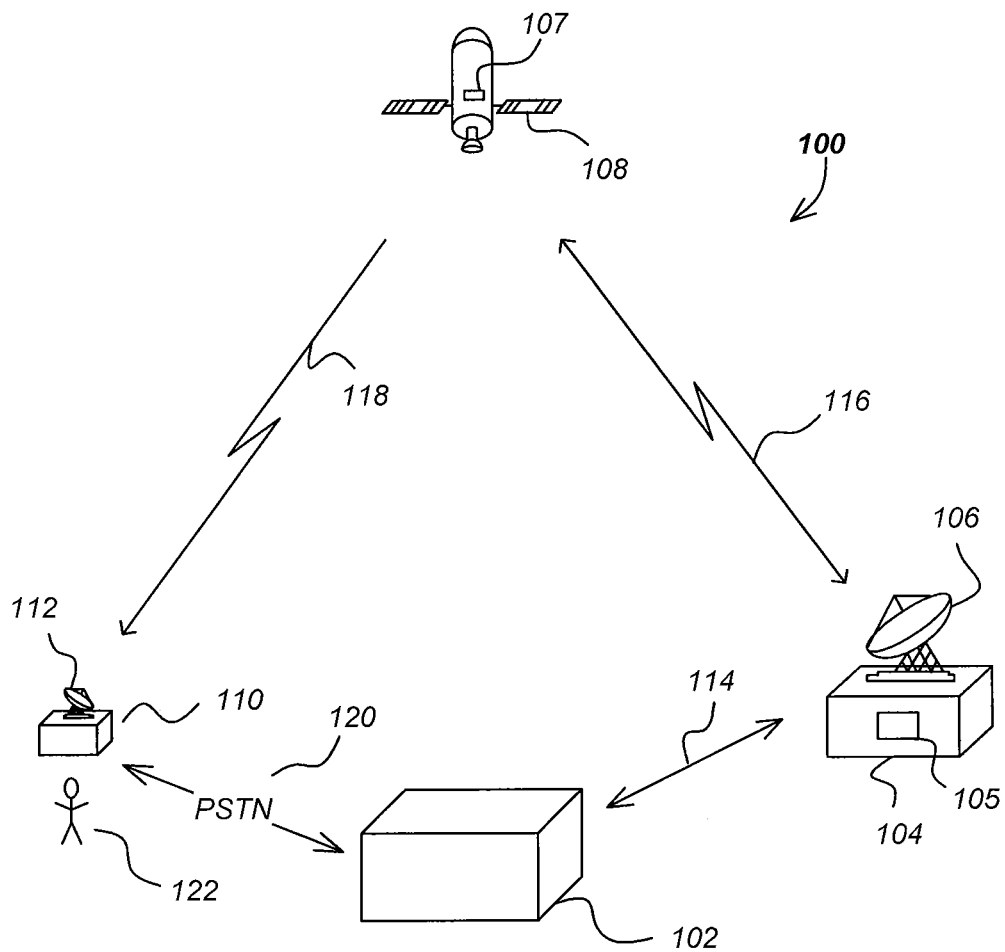
FIG. 1 is a diagram illustrating an overview of a distribution system that can be used to provide video data, software updates, and other data to subscribers.

FIG. 1 is a diagram illustrating an overview of a distribution system 100 that can be used to provide video data, software updates, and other data to subscribers. The distribution system 100 comprises a control center 102 in communication with an uplink center 104 via a ground or other link 114 and with a subscriber receiver station 110 via a public switched telephone network (PSTN) or other link 120. The control center 102, or headend provides program material (e.g. video programs, audio programs, software updates, and other data) to the uplink center 104 and coordinates with the subscriber receiver stations 110 to offer, for example, pay-per-view (PPV) program services, including billing and associated decryption of video programs.

The uplink center receives program material and program control information from the control center 102, and using an uplink antenna 106 and transmitter 105, transmits the program material and program control information to the satellite 108. The satellite receives and processes this information, and transmits the video programs and control information to the subscriber receiver station 110 via downlink 118 using one or transponders 107 or transmitters. The subscriber receiving station 110 receives this information using the outdoor unit (ODU) 112, which includes a subscriber antenna and a low noise block converter (LNB).

In one embodiment, the subscriber receiving station antenna is an 18-inch slightly oval-shaped antenna. Standard definition transmissions are typically in the Ku-band, while the high definition (HD) transmissions are typically in the Ka band. The slight oval shape is due to the 22.5 degree offset feed of the LNB (low noise block converter) which is used to receive signals reflected from the subscriber antenna. The offset feed positions the LNB out of the way so it does not block any surface area of the antenna minimizing attenuation of the incoming microwave signal.

The distribution system 100 can comprise a plurality of satellites 108 in order to provide wider terrestrial coverage, to provide additional channels, or to provide additional bandwidth per channel. In one embodiment of the invention, each satellite comprises 16 transponders to receive and transmit program material and other control data from the uplink center 104 and provide it to the subscriber receiving stations 110. Using data compression and multiplexing techniques the channel capabilities, two satellites 108 working together can receive and broadcast over 150 conventional (non-HDTV) audio and video channels via 32 transponders.

While the invention disclosed herein will be described with reference to a satellite based distribution system 100, the present invention may also be practiced with terrestrial-based transmission of program information, whether by broadcasting means, cable, or other means. Further, the different functions collectively allocated among the control center 102 and the uplink center 104 as described above can be reallocated as desired without departing from the intended scope of the present invention.

Although the foregoing has been described with respect to an embodiment in which the program material delivered to the subscriber 122 is video (and audio) program material such as a movie, the foregoing method can be used to deliver program material comprising purely audio information or other data as well. It is also used to deliver current receiver software and announcement schedules for the receiver to rendezvous to the appropriate downlink 118. Link 120 may be used to report the receiver's current software version.

Uplink Configuration

Figure 2:
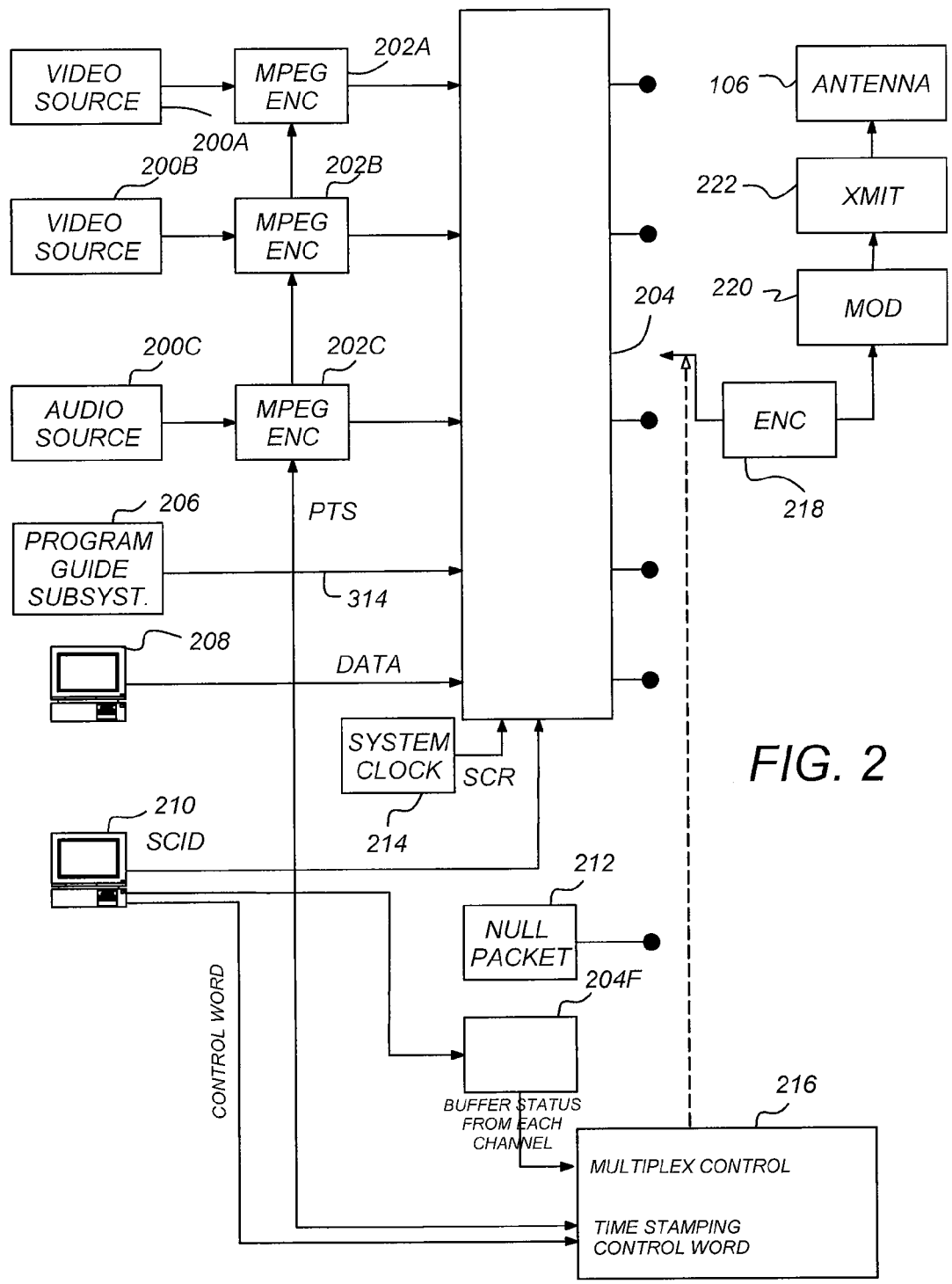
FIG. 2 is a block diagram showing a typical uplink configuration for a single satellite 108 transponder.

FIG. 2 is a block diagram showing a typical uplink configuration for a single satellite 108 transponder, showing how video program material is uplinked to the satellite 108 by the control center 102 and the uplink center 104. FIG. 2 shows two video channels of information from video sources 200A and 200B (which could be augmented respectively with one or more audio channels for high fidelity music, soundtrack information, or a secondary audio program for transmitting foreign languages, for example, audio source 200C), and a data channel from a program guide subsystem 206 and data such as software updates from a data source 208.

The video channels are provided by a program source of video material 200A-200B (collectively referred to hereinafter as video source(s) 200). The data from each video program source 200 is provided to an encoder 202A-202B (collectively referred to hereinafter as encoder(s) 202). The audio channel is provided by a program source of audio material 200C and provided to encoder 202C. Each of the encoders 202A-202C accepts a presentation time stamp (PTS) from the controller 216. The PTS is a wrap-around binary time stamp that is used to assure that the video information is properly synchronized with the audio information after encoding and decoding. A PTS time stamp is sent with each I-frame of the MPEG encoded data.

In one embodiment of the present invention, each encoder 202 is a Motion Picture Experts Group (MPEG) encoder, but other decoders implementing other coding techniques can be used as well. The data channel can be subjected to a similar compression scheme by an encoder (not shown), but such compression is usually either unnecessary, or performed by computer programs in the computer data source (for example, photographic data is typically compressed into *.TIF files or *.JPG files before transmission). After encoding by the encoders 202, the signals are converted into data packets by a packetizer 204.

The data packets are assembled using a reference from the system clock 214 (SCR), and from the conditional access manager 210, which provides the SCID to the packetizers 204 for use in generating the data packets. These data packets are then multiplexed into serial data and transmitted.

Program Guide Subsystem

Figure 3:
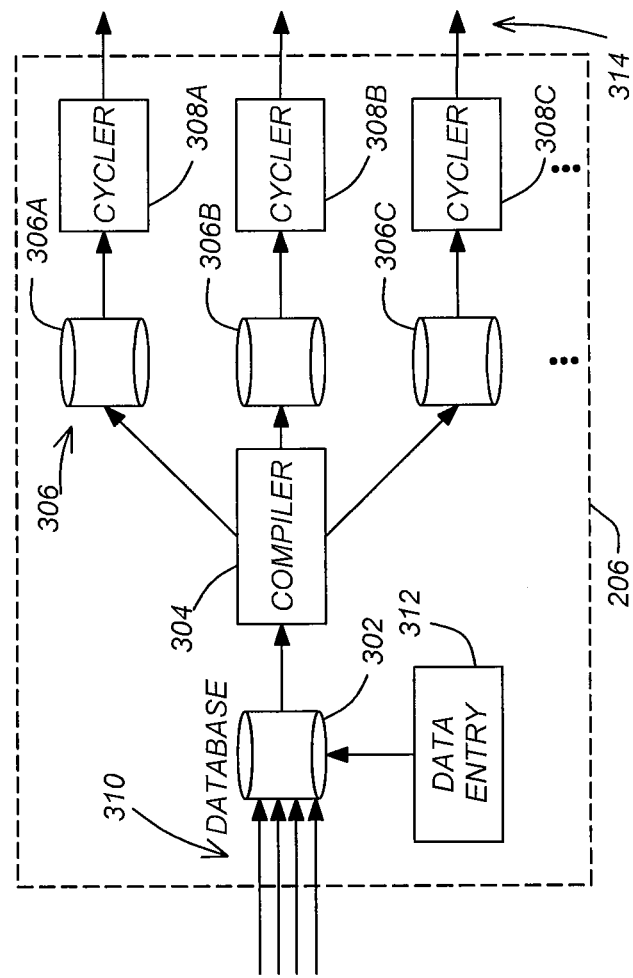
FIG. 3 is a block diagram of one embodiment of the program guide subsystem.

FIG. 3 is a block diagram of one embodiment of the program guide subsystem 206. The program guide data transmitting system 206 includes program guide database 302, compiler 304, sub-databases 306A-306C (collectively referred to as sub-databases 306) and cyclers 308A-308C (collectively referred to as cyclers 308).

Schedule feeds 310 provide electronic schedule information about the timing and content of various television channels, such as that found in television schedules contained in newspapers and television guides. Schedule feeds 310 preferably include information from one or more companies that specialize in providing schedule information, such as GNS, TRIBUNE MEDIA SERVICES, and T.V. DATA. The data provided by companies such as GNS, TRIBUNE MEDIA SERVICES and T.V. DATA are typically transmitted over telephone lines or the Internet to program guide database 302. These companies provide television schedule data for all of the television stations across the nation plus the nationwide channels, such as SHOWTIME, HBO, and the DISNEY CHANNEL. The specific format of the data that are provided by these companies varies from company to company. Program guide database 302 preferably includes schedule data for television channels across the entire nation including all nationwide channels and local channels, regardless of whether the channels are transmitted by the transmission station.

Program guide database 302 is a computer-based system that receives data from schedule feeds 310 and organizes the data into a standard format. Compiler 304 reads the standard form data out of program guide database 302, identifies common schedule portions, converts the program guide data into the proper format for transmission to users (specifically, the program guide data are converted into objects as discussed below) and outputs the program guide data to one or more of sub-databases 308.

Program guide data are also manually entered into program guide database 302 through data entry station 312. Data entry station 312 allows an operator to enter additional scheduling information, as well as combining and organizing data supplied by the scheduling companies. As with the computer organized data, the manually entered data are converted by the compiler into separate objects and sent to one or more of sub-databases 306.

The program guide objects are temporarily stored in sub-databases 306 until cyclers 308 request the information. Each of cyclers 308 preferably transmits objects at a different rate than the other cyclers 308. For example, cycler 308A may transmit objects every second, while cyclers 308B and 308C may transmit objects every 5 seconds and every 10 seconds, respectively.

Since the subscriber's receivers may not always be on and receiving and saving objects, the program guide information is continuously re-transmitted. Program guide objects for programs that will be shown in the next couple of hours are sent more frequently than program guide objects for programs that will be shown later. Thus, the program guide objects for the most current programs are sent to a cycler 308 with a high rate of transmission, while program guide objects for later programs are sent to cyclers 308 with a lower rate of transmission. One or more of the data outputs 314 of cyclers 308 are forwarded to the packetizer of a particular transponder, as depicted in FIG. 2.

It is noted that the uplink configuration depicted in FIG. 2 and the program guide subsystem depicted in FIG. 3 can be implemented by one or more hardware modules, one or more software modules defining instructions performed by a processor, or a combination of both.

Format of Transmitted Program Guide Data

Prior to transmitting program guide data to sub-databases 306, compiler 304 organizes the program guide data from program guide database 302 into objects. Each object preferably includes an object header and an object body. The object header identifies the object type, object ID and version number of the object. The object type identifies the type of the object. The various types of objects are discussed below. The object ID uniquely identifies the particular object from other objects of the same type. The version number of an object uniquely identifies the object from other objects of the same type and object ID. The object body includes data for constructing a portion of a program guide that is ultimately displayed on a user's television.

Prior to transmission, each object is preferably broken down by compiler 304 into multiple frames. Each frame is made up of a plurality of 126 byte packets with each such packet marked with a service channel identification (SCID) number. The SCIDs are later used by receiver or set top box to identify the packets that correspond to each television channel. Each frame includes a frame header, program guide data and a checksum. Each frame header includes the same information as the object header described above—object type, object ID and version number. The frame header uniquely identifies the frame, and its position within a group of frames that make up an object. The program guide data within frames are used by set top box (shown in FIG. 5) to construct and display a program guide and other information on a user's television. The checksum is examined by set top box 500 to verify the accuracy of the data within received frames.

The following is a list of preferred object types, although many additional or different object types may be used: boot object, data announcement object, update list object, channel object, schedule object, program object, time object, deletion object, and a reserved object.

A boot object (BO) identifies the SCIDs where all other objects can be found. A boot object is always transmitted on the same channel, which means that each packet of data that makes up a boot object is marked with the same SCID number. Boot objects are transmitted frequently to ensure that set top boxes 500 which have been shut off, and are then turned back on, immediately receive information indicating the location of the various program guide objects. Thus, boot objects are sent from compiler 304 to a cycler 308 with a high rate of transmission.

A data announcement object (DAO) is an object that includes data that is to be announced to some or all of the set top boxes. The data announcement object can be used in the system described below to indicate that there is updated software to be installed in the set top box.

An update list object (ULO) contains a list of all the channel objects (COs, which are discussed below) in a network. A network is a grouping of all channels from a common source, such as all Digital Satellite System (DSAT) channels. For each channel object in the list of channel objects, the channel list object includes a channel object ID for that channel object. Each channel object is uniquely identified by its channel object ID.

Each channel object provides information about a particular channel. Each channel object points to a schedule object (discussed further below). Each channel object includes multiple fields or descriptors that provide information about that channel. Each descriptor includes a descriptor type ID that indicates the type of the descriptor. Descriptor types include "about" descriptors, "category" descriptors, and "reserved" descriptors. The "about" descriptor provides a description of the channel. When there is no "about" descriptor, the description defaults to a message such as "No Information Available". The "category" descriptor provides a category classification for the channel. More than one "category" descriptor can appear in the channel object if the channel falls into more than one category. "Category" descriptors preferably provide a two-tiered category classification, such as "sports/baseball" or "movie/drama", although any number of tiers may be used including single tiers. "Reserved" descriptors are saved for future improvements to the system.

A program object (PO) provides a complete description of a program. The program object is pointed to by other objects (namely, schedule objects, and HTML objects) that contain the starting time and duration of the program. Like channel objects, descriptors are used within program objects. Program objects use the same types of descriptors as channel objects. Category descriptors provide a category classification for a program and "about" descriptors provide a description of the program. If compiler 52 determines that a particular program is scheduled to appear on multiple channels, the program object for that program is transmitted a single time for the multiple channels, although, as discussed above, it may be retransmitted multiple times.

A schedule object (SO) points to a group of program objects. A schedule object is assigned a time duration by a schedule object (discussed below). Each schedule object identifies all of the program objects that must be acquired for the assigned time duration. Each schedule object is uniquely identified by a schedule object ID. A unique schedule object may be pointed to by more than one schedule object. As time progresses and the scheduling information becomes stale, the schedule object is no longer needed. Schedule objects that are not referenced by any schedule object are discarded by set top box 500.

A schedule object (SO) contains the start time of the entire schedule, as well as the start time and duration of the general program objects. A schedule object points to program objects. The start time of each schedule object is given by its start time. As time progresses and the scheduling information becomes stale, a new schedule object replaces the previous version, and updates the scheduling information. Thus, the channel object of the schedule object need not be updated. Only the schedule object is updated.

A time object (TO) provides the current time of day and date at transmission station 26. Time objects include format codes that indicate which part of the date and time is to be displayed. For example, the only part of the date of interest might be the year. Similarly, whenever dates and times are transmitted within an object, the dates and times are accompanied by format codes. The format codes instruct set top box 500 which portion of the transmitted date and time to display.

A deletion object (DO) provides a list of object IDs that set top box 500 must discard.

Reserved objects are saved for future improvements to the program guide system. When a new type of object is defined, all objects of that new type will include an object header with a reserved object type.

Broadcast Data Stream Format and Protocol

FIG. 4A is a diagram of a representative data stream. The first packet segment 402 comprises information from video channel 1 (data coming from, for example, the first video program source 200A). The next packet segment 404 comprises computer data information that was obtained, for example from the computer data source 208. The next packet segment 406 comprises information from video channel 5 (from one of the video program sources 200). The next packet segment 408 comprises program guide information such as the information provided by the program guide subsystem 206. As shown in FIG. 4A, null packets 410 created by the null packet module 212 may be inserted into the data stream as desired.

The data stream therefore comprises a series of packets from any one of the data sources in an order determined by the controller 216. The data stream is encrypted by the encryption module 218, modulated by the modulator 220 (typically using a QPSK modulation scheme), and provided to the transmitter 222, which broadcasts the modulated data stream on a frequency bandwidth to the satellite via the antenna 106. The receiver 200 receives these signals, and using the SCID, reassembles the packets to regenerate the program material for each of the channels.

FIG. 4B is a diagram showing one embodiment of a data packet for one transport protocol that can be used with the present invention. Each data packet (e.g. 402-416) is 147 bytes long, and comprises a number of packet segments. The first packet segment 420 comprises two bytes of information containing the SCID and flags. The SCID is a unique 12-bit number that uniquely identifies the data packet's data channel. The flags include 4 bits that are used to control whether the packet is encrypted, and what key must be used to decrypt the packet. The second packet segment 422 is made up of a 4-bit packet type indicator and a 4-bit continuity counter. The packet type identifies the packet as one of the four data types (video, audio, data, or null). When combined with the SCID, the packet type determines how the data packet will be used. The continuity counter increments once for each packet type and SCID. The next packet segment 424 comprises 127 bytes of payload data, which is a portion of the video program provided by the video program source 300 or other audio or data sources. The final packet segment 426 is data required to perform forward error correction.

The present invention may also be implemented using MPEG transport protocols. FIG. 4C is a diagram showing another embodiment of a data packet for the MPEG-2 transport protocol. Each data packet comprises a sync byte 450, three transport flags 453, and a packet identifier (PID) 454. The sync byte 450 is used for packet synchronization. The transport flags include a transport error indicator flat (set if errors cannot be corrected in the data stream), a payload unit start indicator (indicting the start of PES data or PSI data, and a transport priority flag. The PID 454 is analogous to the SCID discussed above in that it identifies a data channel. A demultiplexer in the transport chip discussed below extracts elementary streams from the transport stream in part by looking for packets identified by the same PID. As discussed below, time-division multiplexing is be used to decide how often a particular PID appears in the transport stream. The scramble control flag 456 indicates how the payload is scrambled, the adaptation field flag 458 indicates the presence of an adaptation field, and the payload flag 460 indicates that the packet includes payload.

Set Top Box

Figure 5:
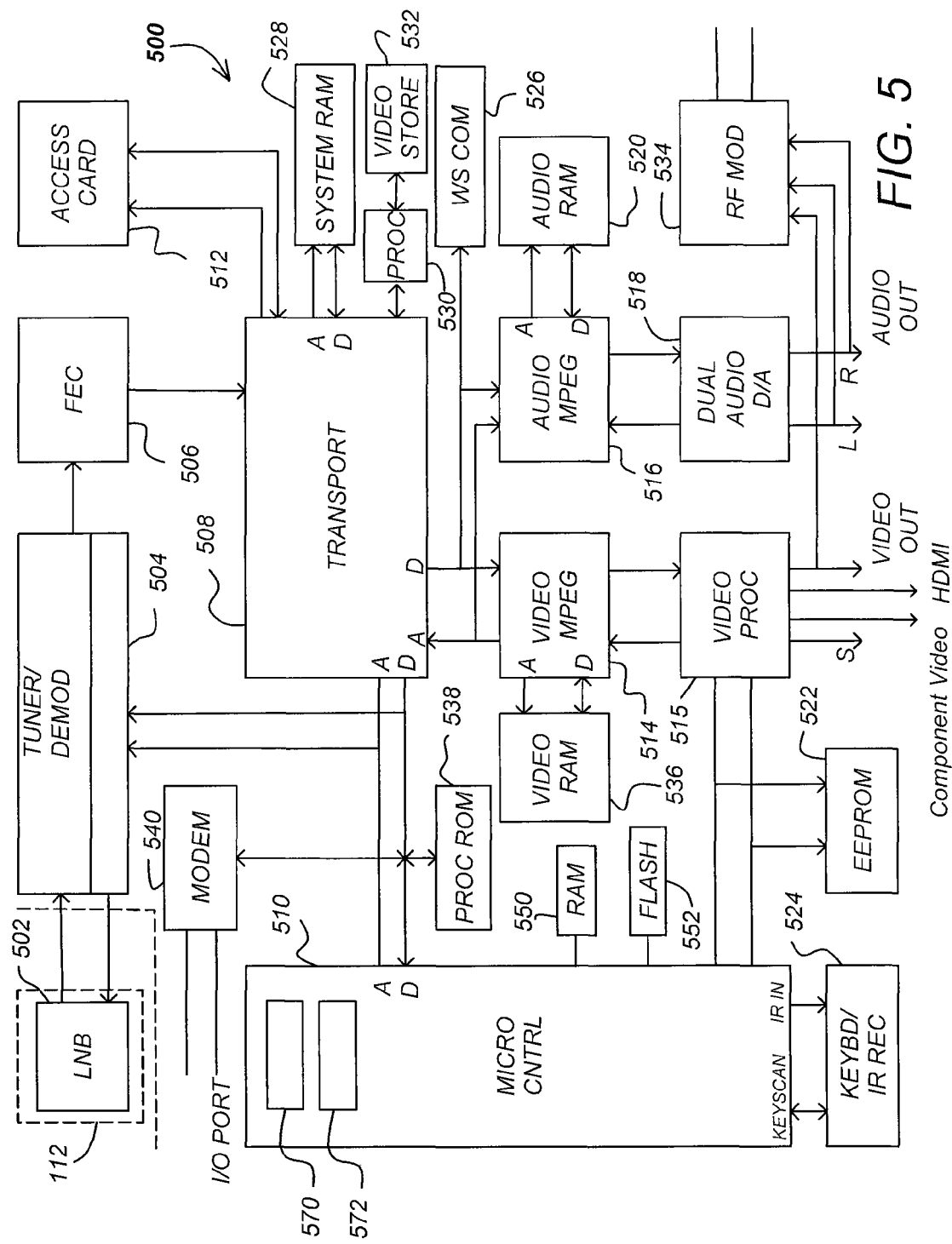
FIG. 5 is a block diagram of an exemplary set top box.

FIG. 5 is a block diagram of a set top box (STB) 500 (also hereinafter alternatively referred to as receiver or integrated receiver/decoder, or IRD). The set top box 500 is part of the receiver station and may comprise a tuner/demodulator 504 communicatively coupled to an ODU 112 having one or more LNBs 502. The LNB 502 converts the 12.2- to 12.7 GHz downlink 118 signal from the satellites 108 to, e.g., a 950-1450 MHz signal required by the set top box's 500 tuner/demodulator 504. The LNB 502 may provide either a dual or a single output. The single-output LNB 502 has only one RF connector, while the dual output LNB 502 has two RF output connectors and can be used to feed a second tuner 504, a second set top box 500 or some other form of distribution system.

The tuner/demodulator 504 isolates a single, digitally modulated transponder, and converts the modulated data to a digital data stream. As packets are received, the tuner/demodulator 504 identifies the type of each packet. If tuner/demodulator 504 identifies a packet as program guide data, tuner/demodulator 504 outputs the packet to memory 78. The digital data stream is then supplied to a forward error correction (FEC) decoder 506. This allows the set top box 500 to reassemble the data transmitted by the uplink center 104 (which applied the forward error correction to the desired signal before transmission to the subscriber receiving station 110) verifying that the correct data signal was received and correcting errors, if any. The error-corrected data may be fed from the FEC decoder module 506 to the transport module 508 via an 8-bit parallel interface.

The transport module 508 performs many of the data processing functions performed by the set top box 500. The transport module 508 processes data received from the FEC decoder module 506 and provides the processed data to the video MPEG decoder 514, the audio MPEG decoder 516, and the microcontroller 150 and/or data storage processor 530 for further data manipulation. In one embodiment of the present invention, the transport module, video MPEG decoder and audio MPEG decoder are all implemented on integrated circuits. This design promotes both space and power efficiency, and increases the security of the functions performed within the transport module 508. The transport module 508 also provides a passage for communications between the microprocessor 510 and the video and audio MPEG decoders 514, 516. As set forth more fully hereinafter, the transport module also works with the conditional access module (CAM) 512 to determine whether the subscriber receiving station 110 is permitted to access certain program material. Data from the transport module can also be supplied to external communication module 526.

The CAM 512 functions in association with other elements to decode an encrypted signal from the transport module 508. The CAM 512 may also be used for tracking and billing these services. In one embodiment of the present invention, the CAM 512 is a smart card, having contacts cooperatively interacting with contacts in the set top box 500 to pass information. In order to implement the processing performed in the CAM 512, the set top box 500, and specifically the transport module 508 provides a clock signal to the CAM 512.

Video data is processed by the MPEG video decoder 514. Using the video random access memory (RAM) 536, the MPEG video decoder 514 decodes the compressed video data and sends it to an encoder or video processor 515, which converts the digital video information received from the video MPEG module 514 into an output signal usable by a display or other output device. By way of example, processor 515 may comprise a National TV Standards Committee (NTSC) or Advanced Television Systems Committee (ATSC) encoder. In one embodiment of the invention both S-Video, baseband video and RF modulated video (NTSC or ATSC) signals are provided. Other outputs may also be utilized, and are advantageous if high definition programming is processed. Such outputs may include, for example, component video and the high definition multimedia interface (HDMI).

Audio data is likewise decoded by the MPEG audio decoder 516. The decoded audio data may then be sent to a digital to analog (D/A) converter 518. In one embodiment of the present invention, the D/A converter 518 is a dual D/A converter, one for the right and left channels. If desired, additional channels can be added for use in surround sound processing or secondary audio programs (SAPs). In one embodiment of the invention, the dual D/A converter 518 itself separates the left and right channel information, as well as any additional channel information. Other audio formats such as DOLBY DIGITAL AC-3 may similarly be supported.

A description of the processes performed in the encoding and decoding of video streams, particularly with respect to MPEG and JPEG encoding/decoding, can be found in Chapter 8 of "Digital Television Fundamentals," by Michael Robin and Michel Poulin, McGraw-Hill, 1998, which is hereby incorporated by reference herein.

The microprocessor 510 receives and processes command signals from the remote control 524, an set top box 500 keyboard interface, modem 540, and transport 508. The microcontroller receives commands for performing its operations from a processor programming memory, which permanently stores such instructions for performing such commands. The memory used to store data for microprocessor 510 and/or transport 508 operations may comprise a read only memory (ROM) 538, an electrically erasable programmable read only memory (EEPROM) 522, a flash memory 552 and/or a random access memory 550, and/or similar memory devices. The microprocessor 510 also controls the other digital devices of the set top box 500 via address and data lines (denoted "A" and "D" respectively, in FIG. 5).

The modem 540 connects to the customer's phone line via the PSTN port 120. It calls, e.g. the program provider, and transmits the customer's purchase information for billing purposes, and/or other information. The modem 540 is controlled by the microprocessor 510. The modem 540 can output data to other I/O port types including standard parallel and serial computer I/O ports. Data can also be obtained from a cable or digital subscriber line (DSL) modem, or any other suitable source.

The set top box 500 may also comprise a local storage unit such as the storage device 532 for storing video and/or audio and/or other data obtained from the transport module 508. Video storage device 532 can be a hard disk drive, a read/writeable compact disc of DVD, a solid state RAM, or any other storage medium. In one embodiment of the present invention, the video storage device 532 is a hard disk drive with specialized parallel read/write capability so that data may be read from the video storage device 532 and written to the device 532 at the same time. To accomplish this feat, additional buffer memory accessible by the video storage 532 or its controller may be used. Optionally, a video storage processor 530 can be used to manage the storage and retrieval of the video, audio, and/or other data from the storage device 532. The video storage processor 530 may also comprise memory for buffering data passing into and out of the video storage device 532. Alternatively or in combination with the foregoing, a plurality of video storage devices 532 can be used. Also alternatively or in combination with the foregoing, the microprocessor 510 can also perform the operations required to store and or retrieve video and other data in the video storage device 532.

The video processing module 515 output can be directly supplied as a video output to a viewing device such as a video or computer monitor. In addition the video and/or audio outputs can be supplied to an RF modulator 534 to produce an RF output and/or 8 vestigal side band (VSB) suitable as an input signal to a conventional television tuner. This allows the set top box 500 to operate with televisions without a video input.

Each of the satellites 108 comprises one or more transponder, each of which accepts program information from the uplink center 104, and relays this information to the subscriber receiving station 110. Known multiplexing techniques are used so that multiple channels can be provided to the user. These multiplexing techniques include, by way of example, various statistical or other time domain multiplexing techniques and polarization multiplexing. In one embodiment of the invention, a single transponder operating at a single frequency band carries a plurality of channels identified by respective service channel identification (SCID).

Preferably, the set top box 500 also receives and stores a program guide in a memory available to the microprocessor 510. Typically, the program guide is received in one or more data packets in the data stream from the satellite 108. The program guide can be accessed and searched by the execution of suitable operation steps implemented by the microcontroller 510 and stored in the processor ROM 538. The program guide may include data to map viewer channel numbers to satellite networks, satellite transponders and service channel identifications (SCIDs), and also provide TV program listing information to the subscriber 122 identifying program events.

Initially, as data enters the set top box 500, the tuner/demodulator 504 looks for a boot object. Boot objects are always transmitted with the same SCID number, so tuner 504 knows that it must look for packets marked with that identification number. A boot object identifies the identification numbers where all other objects can be found.

As data is received and stored in the memory, the microprocessor 510 acts as a control device and performs various operations on the data in preparation for processing the received data. These operations include packet assembly, object assembly and object processing.

The first operation performed on data objects stored in the memory 550 is packet assembly. During the packet assembly operation, microprocessor 510 examines the stored data and determines the locations of the packet boundaries.

The next step performed by microprocessor 510 is object assembly. During the object assembly step, microprocessor 510 combines packets to create object frames, and then combines the object frames to create objects. Microprocessor 510 examines the checksum transmitted within each object frame, and verifies whether the frame data was accurately received. If the object frame was not accurately received, it is discarded from memory 550. Also during the object assembly step, the microprocessor 510 discards assembled objects that are of an object type that the microprocessor 510 does not recognize. The set top box 500 maintains a list of known object types in memory 550. The microprocessor 510 examines the object header of each received object to determine the object type, and the microprocessor 510 compares the object type of each received object to the list of known object types stored in memory 550. If the object type of an object is not found in the list of known object types, the object is discarded from memory 550. Similarly, the set top box 500 maintains a list of known descriptor types in memory 550, and discards any received descriptors that are of a type not in the list of known descriptor types.

The last step performed by microprocessor 510 on received object data is object processing. During object processing, the objects stored in the memory 550 are combined to create a digital image. Instructions within the objects direct microprocessor 510 to incorporate other objects or create accessible user-links. Some or all of the digital images can be later converted to an analog signal that is sent by the set top box 500 to a television or other display device for display to a user.

The functionality implemented in the set top box 500 depicted in FIG. 5 can be implemented by one or more hardware modules, one or more software modules defining instructions performed by a processor, or a combination of both.

Figure 6:
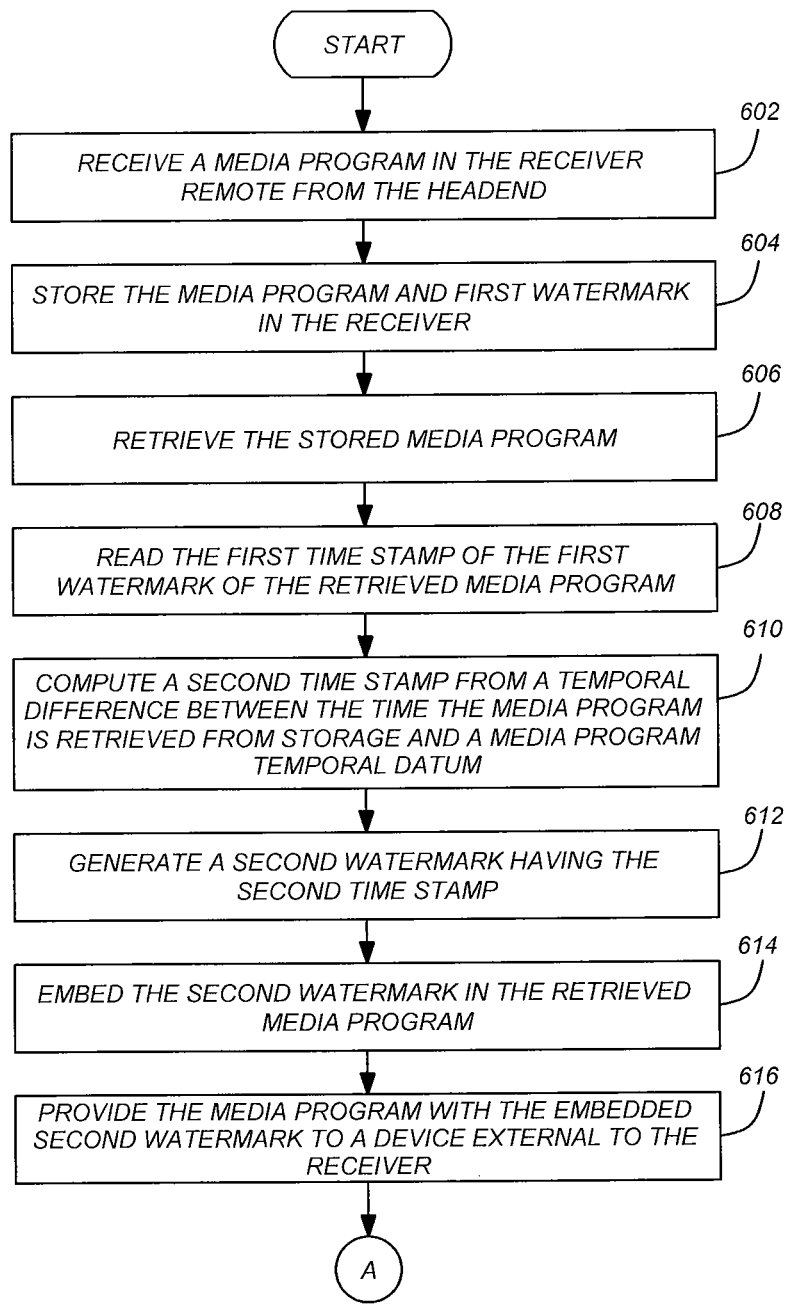
FIG. 6 is a flow chart presenting exemplary operations that can be used to practice one embodiment of the present invention.
Figure 7:
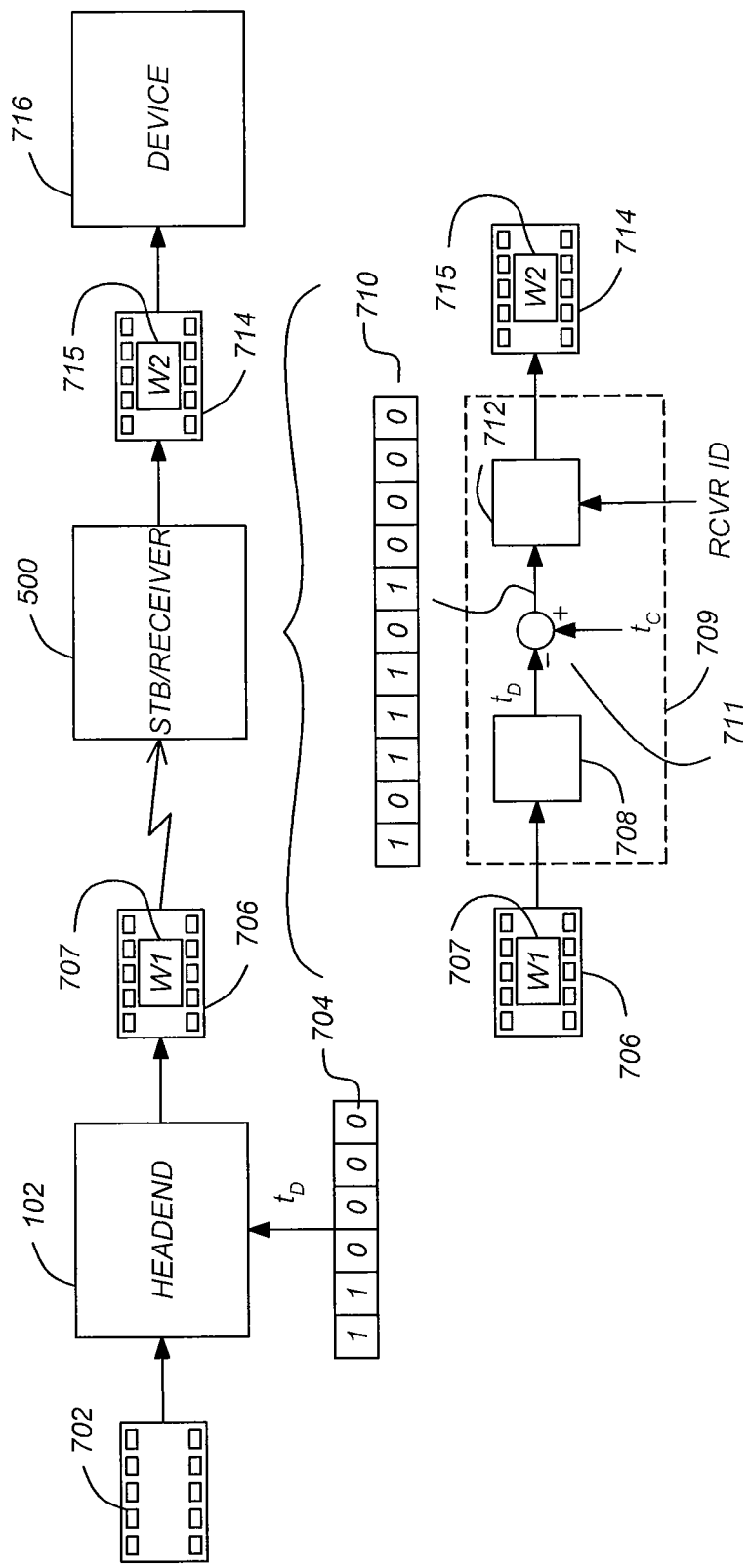
FIG. 7 is a diagram showing how a media program maybe separated into portions.

FIGS. 6 and 7 are diagrams illustrating exemplary operations that can be used to practice one embodiment of the present invention. As described above, one of the obstacles in providing that media program to remote subscribers for viewing during the theatrical release period is the difficulty in assuring that unauthorized copies of the media program are not made and redistributed. One of the ways to deter such copying is to modify the media program with a watermark that identifies the receiver 500 from which the copy was ultimately made. The date or time at which the copy was made can also provide evidence that can be used to charge those who have made unauthorized copies of the media program. However, since the time between the date the media program becomes available for reception and downloading for pay-per-view during the theatrical release and the date that the media program is ultimately copied may be in the order of months, it is difficult to obtain sufficiently accurate estimates of the time that the copy was made without using a time stamp with an unacceptably large number of bits.

Turning to FIGS. 6 and 7, the headend 102 receives a media program 702 from a media program provider. The headend 102 generates a first time stamp describing a media program temporal datum $t_D$. The media program temporal datum $t_D$ includes information that is used by the receiver 500 to generate a new time stamp $t_R$, but can be determined without reference to the time stamp at a later time, when an effort is begun to determine when the media program was replayed from the receiver 500. In one embodiment, the media program temporal datum is the point in time wherein the media program first became available for reception and downloading by the receiver 500. That time, for example, can be known globally, and is the same time for every receiver 500. The media program temporal datum $t_D$ can also be described with respect to a global temporal datum, for all media programs. For example, a global temporal datum of Jan. 1, 2010 may be selected.

The first time stamp can be represented according to a first resolution. This resolution can be determined by the maximum time period to be represented between the global temporal datum and the media program temporal datum $t_D$ and the number of bits used to represent the value. In the example illustrated in FIG. 7, the first time stamp is represented by six bits. Each bit can represent a count, which can represent a minimum time interval representable by the first time stamp.

For example, each bit of the first time stamp may represent one month from the global temporal datum of Jan. 1, 2010. Therefore if the media program was first made available on Jan. 1, 2014 and the resolution of the time stamp were one month, the time stamp value would be 48 counts after the global temporal datum of Jan. 1, 2010 or "110000."

The time stamp is included in a first watermark 707 that is embedded in the media program 702 by the headend 102. The media program with the embedded watermark 706 is then transmitted from the headend 102 to receiver 500 remote from the headend.

Turning now to FIG. 6, the media program with the embedded watermark 706 is received in the receiver 500, as shown in block 602. As described above, the media program includes a first watermark including a time stamp that describes a media program temporal datum $t_D$ having a first resolution. This step can be performed, for example, by the tuner 504 of the receiver 500. The media program and the first watermark are stored, as shown in block 604. In one embodiment, the media program and/or the first watermark are stored in the receiver 500, for example in the video store 532 shown in FIG. 5. In other embodiments, the media program and/or first watermark are stored external to but in a location accessible to the receiver 500, such as an external hard drive or other device. Further, the media program and the watermark or time-stamp included with the watermark can be extracted from the media program and stored separate from the media program (for example, as metadata) for later use, or the watermark and timestamp can be stored by allowing it to remain embedded in the media program that is stored.

In one embodiment, only small portions of the media program and first watermark 706 are stored and they are stored for only a short period of time before they are retrieved and provided to an external device such as a television. In this embodiment, the storage and retrieval can be analogized to a buffering process. In this embodiment, larger, portions of the media program are stored and for a longer time, but again, the entire media program is not stored in its entirety, and retrieval and playback occurs in a time period shorter than the duration of the media program. This embodiment is analogous to a "live pause" or "play while recording" embodiment, in which one portion of the media program may be stored while other portions are being played back. Finally, in another embodiment, the entire media program is stored before retrieval and playback commence. This embodiment is analogous to the situation wherein the user downloads an entire movie for retrieval and replay that may take place hours, days, or even months later.

In block 606, the stored media program is retrieved. This can be accomplished, for example, by the video storage device 532. The first time stamp of the first water mark 707 of the retrieved program is read, as shown in block 608. The first watermark 707 and timestamp can be read as metadata that was stored separately from the media program, or can be read by extracting the first watermark 707 and timestamp from the retrieved media program.

A second time stamp 710 is then computed from a temporal difference between the time the media program is retrieved from storage and the media program temporal datum, as shown in block 610.

A second watermark having the second time stamp that includes the second time stamp 710 is generated, as shown in block 612. The watermark may also include an identifier that unique to the receiver 500, thus allowing the receiver to be identified. That second watermark is then embedded in the media program, as shown in block 614.

The operations of block 606-614 can be performed in a watermark module 709, which may comprise a watermark reader 708, differencer 711, and a watermark generator 712.

The media program with the embedded second watermark is provided to a device external to the receiver 500, as shown in block 616. This external device is typically be a television or display, but particularly in cases where unauthorized copies of the media program are made, may be another device such as a memory or a second video storage device.

In one embodiment, the second time stamp 710 has a temporal resolution that is greater than the resolution of the first time stamp. In on one of the examples discussed above, it was suggested that the first time stamp 704 may have a resolution of one month (e.g. each bit of the first time stamp represented one month). The second time stamp 710 may then be selected to have temporal resolution greater than a month, for example, one day.

For example, if, in accordance with the previous example, the media program was first made available on Jan. 1, 2014 and the global temporal datum was Jan. 1, 2010 and the temporal resolution of the first time stamp were one month, the first time stamp would be set equal to 48 (e.g. 48 months). Suppose that media program is retrieved from storage on Feb. 1, 2014. The receiver 500 reads the first time stamp of 48 months, determines that this is equivalent to Jan. 1, 2014. The receiver 500 then determines the time and date at which the media program was retrieved (in this example, Feb. 1, 2014) and takes the difference between the Feb. 1, 2014 and the Jan. 1, 2014 date. Since this is 31 days and there are 24 hours in a day, that amounts to 744 hours or 1488 half hour periods. If a temporal resolution for the second watermark of ½ hour were desired, the receiver would compute a second time stamp of 1488 (1011101000 in binary), store that second time stamp in the second watermark 715, and embed the second water mark in the media program.

In one embodiment, the second time stamp comprises k bits wherein $$k = \text{int}\left[\frac{\log\left(\frac{T_{theatrical}}{R}\right)}{\log(2)}\right] + 1$$

and wherein $T_{theatrical}$ is the theatrical release period, R is the second temporal resolution, and the int(*) function truncates the value to the integer value. Therefore, if the theatrical release period was 90 days and a resolution of 0.5 hour was desired, the second time stamp can be expressed by $$\left(\frac{90*24}{0.5}\right) = 4320$$

time periods, which requires that the second time stamp be number expressible by 13 bits.

$$k = \text{int}\left[\frac{\log(4320)}{\log(2)}\right] + 1 = \text{int}(12.076) + 1 = 12 + 1 = 13$$

As can be seen, the foregoing technique takes advantage of the fact that accurate data regarding the time that the media program was retrieved (and presumably copied) need only be retained for the period of the theatrical release of the media program. Unauthorized reproductions after the theatrical release are of interest, but of lesser interest than such reproductions during the theatrical release, when the value of the media program is at its peak.

Figure 8:
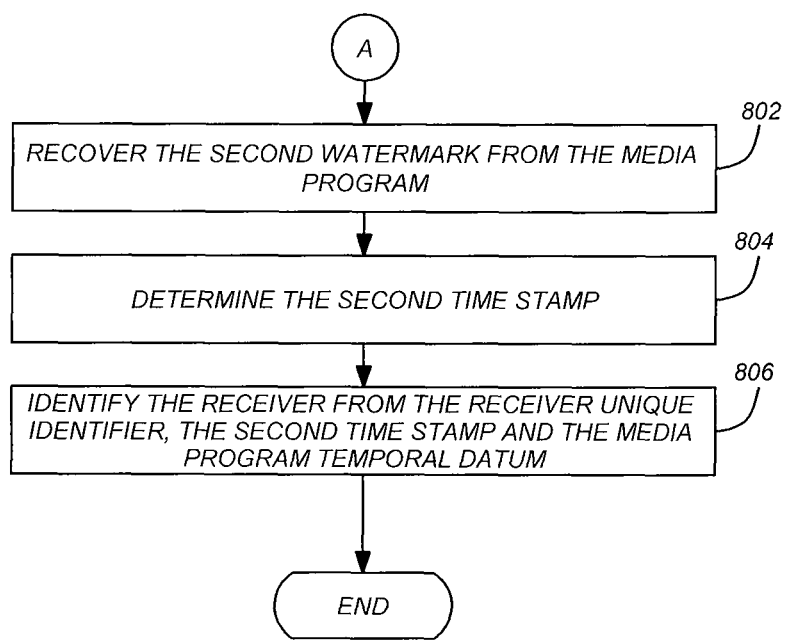
FIG. 8 is a flow chart presenting exemplary process steps that can be used by a receiver remote from the headend to receive and process the first and second set of media program packets.

FIG. 8 is a flowchart illustrating exemplary method steps that can be used to determine the identity of the receiver 500 that retrieved the media program from storage, and the time at which the media program was retrieved. This information can be useful, for example, in identifying people who have made unauthorized copies of the media program. These operations may be performed at the headend 102, at the receiver station 110 or at other locations and may be performed on the copy of the media program that was retrieved and provided to the external device, or upon further copies made from the retrieved copies.

In block 802, the second watermark 715 is recovered from the media program. The second watermark 715 remains with the media program regardless of how many times the media program is copied or how many generations of the media program copy have been made, and the time stamp 710 in the second watermark 715 will still indicate which receiver 500 the first copy was made from and when that media program was retrieved from storage.

In block 804, the second time stamp 710 is recovered from the second watermark. The identity of the media program (e.g. which movie) is easily determined by simply watching a portion of the movie. The media program temporal datum $t_D$ (e.g. the date on which the identified media program was first made available for download) is then determined. Such information is typically known to the headend 102 or the provider of the media program, and can also be obtained from archived records. Given the value $t_D$ and the second time stamp, it can be determined when the media program was retrieved from storage. This information, along with the receiver unique identifier, can be used to identify the receiver and potentially, the individual responsible for making the unauthorized copy of the media program.

Figure 9:
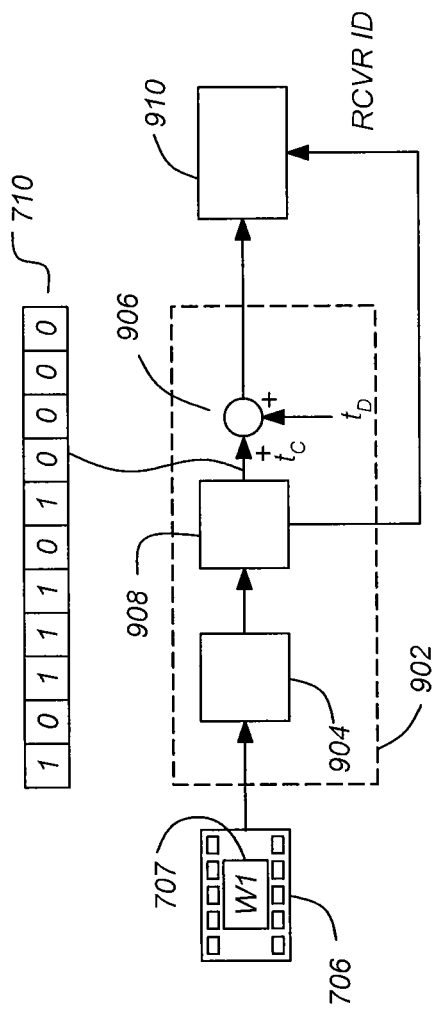
FIG. 9 is a diagram showing one embodiment of the program stream resulting from the application of the process described in FIG. 8.
Figure 10:
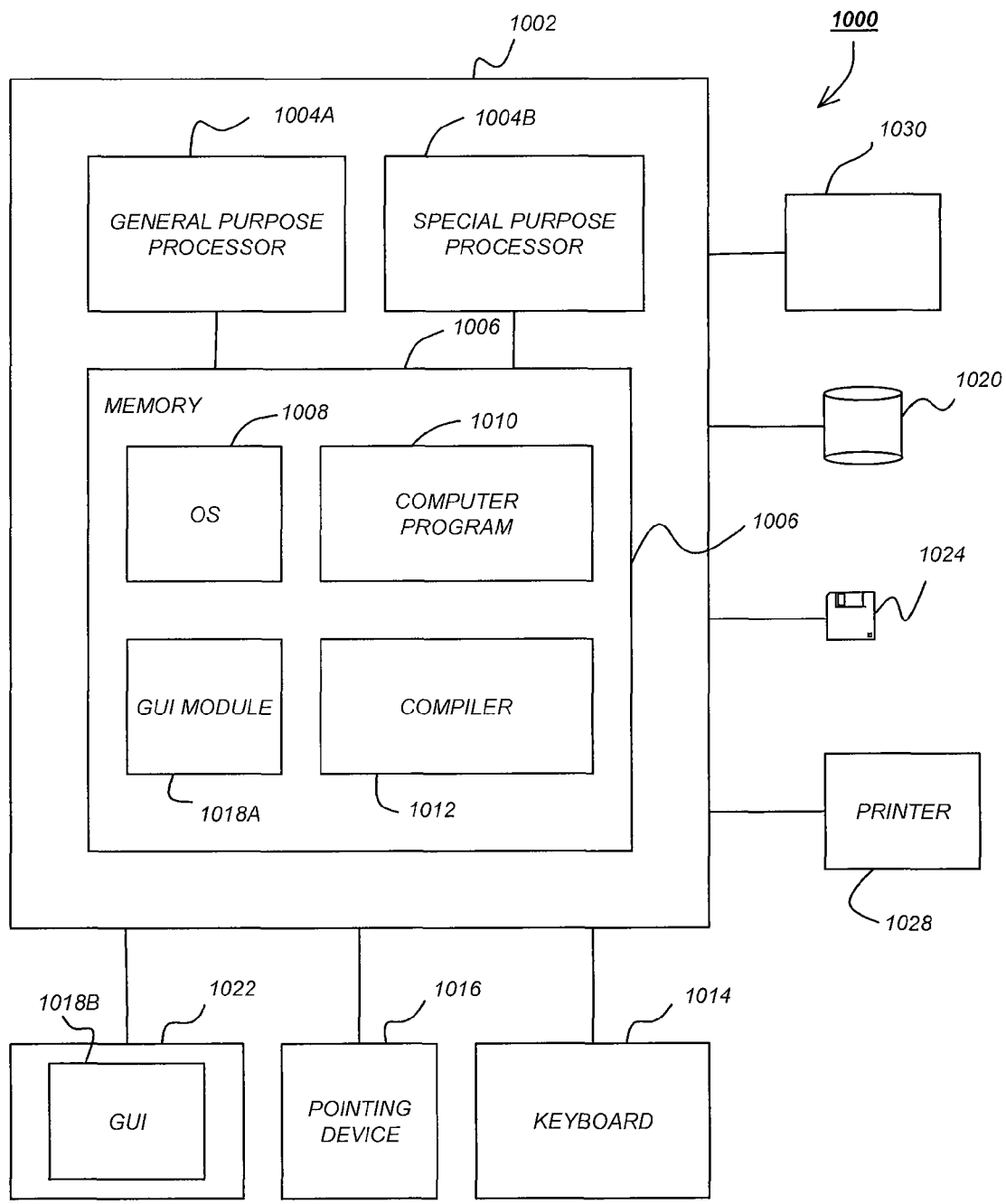
FIG. 10 is a diagram illustrating exemplary process steps that can be used to substitute a selected some of the second set of media program packets for the associated media program packets in the first set of media program packets.

FIG. 9 is a diagram illustrating a watermark analysis module 902 that can be used to perform the operations of blocks 802-806. The watermark analysis module 902 comprises a watermark recovery module 904, a time stamp module 908 for determining the second time stamp, and a summer 906 for determining when the media program was retrieved from the receiver 500 using the media program temporal datum $t_D$ and the second time stamp $t_C$. That information can be provided to the receiver identification module 910, where it can be used with the receiver identifier (also retrieved from the second watermark 707) to identify which receiver 500 reproduced the media program and when that reproduction took place. This information is useful in identifying and prosecuting persons who create unauthorized copies of the media program.

FIG. 13 is a diagram illustrating an exemplary computer system 1000 that could be used to implement elements of the present invention. The computer 1002 comprises a general purpose hardware processor 1004A and/or a special purpose hardware processor 1004B (hereinafter alternatively collectively referred to as processor 1004) and a memory 1006, such as random access memory (RAM). The computer 1002 may be coupled to other devices, including input/output (I/O) devices such as a keyboard 1014, a mouse device 1016 and a printer 1028.

In one embodiment, the computer 1002 operates by the general purpose processor 1004A performing instructions defined by the computer program 1010 under control of an operating system 1008. The computer program 1010 and/or the operating system 1008 may be stored in the memory 1006 and may interface with the user and/or other devices to accept input and commands and, based on such input and commands and the instructions defined by the computer program 1010 and operating system 1008 to provide output and results.

Output/results may be presented on the display 1022 or provided to another device for presentation or further processing or action. In one embodiment, the display 1022 comprises a liquid crystal display (LCD) having a plurality of separately addressable pixels formed by liquid crystals. Each pixel of the display 1022 changes to an opaque or translucent state to form a part of the image on the display in response to the data or information generated by the processor 1004 from the application of the instructions of the computer program 1010 and/or operating system 1008 to the input and commands. Other display 1022 types also include picture elements that change state in order to create the image presented on the display 1022. The image may be provided through a graphical user interface (GUI) module 1018A. Although the GUI module 1018A is depicted as a separate module, the instructions performing the GUI functions can be resident or distributed in the operating system 1008, the computer program 1010, or implemented with special purpose memory and processors.

Some or all of the operations performed by the computer 1002 according to the computer program 1010 instructions may be implemented in a special purpose processor 1004B. In this embodiment, some or all of the computer program 1010 instructions may be implemented via firmware instructions stored in a read only memory (ROM), a programmable read only memory (PROM) or flash memory within the special purpose processor 1004B or in memory 1006. The special purpose processor 1004B may also be hardwired through circuit design to perform some or all of the operations to implement the present invention. Further, the special purpose processor 1004B may be a hybrid processor, which includes dedicated circuitry for performing a subset of functions, and other circuits for performing more general functions such as responding to computer program instructions. In one embodiment, the special purpose processor is an application specific integrated circuit (ASIC).

The computer 1002 may also implement a compiler 1012 which allows an application program 1010 written in a programming language such as COBOL, C++, FORTRAN, or other language to be translated into processor 1004 readable code. After completion, the application or computer program 1010 accesses and manipulates data accepted from I/O devices and stored in the memory 1006 of the computer 1002 using the relationships and logic that was generated using the compiler 1012.

The computer 1002 also optionally comprises an external communication device such as a modem, satellite link, Ethernet card, or other device for accepting input from and providing output to other computers.

In one embodiment, instructions implementing the operating system 1008, the computer program 1010, and/or the compiler 1012 are tangibly embodied in a computer-readable medium, e.g., data storage device 1020, which could include one or more fixed or removable data storage devices, such as a zip drive, floppy disc drive 1024, hard drive, CD-ROM drive, tape drive, or a flash drive. Further, the operating system 1008 and the computer program 1010 are comprised of computer program instructions which, when accessed, read and executed by the computer 1002, causes the computer 1002 to perform the steps necessary to implement and/or use the present invention or to load the program of instructions into a memory, thus creating a special purpose data structure causing the computer to operate as a specially programmed computer executing the method steps described herein. Computer program 1010 and/or operating instructions may also be tangibly embodied in memory 1006 and/or data communications devices 1030, thereby making a computer program product or article of manufacture according to the invention. As such, the terms "article of manufacture," "program storage device" and "computer program product" or "computer readable storage device" as used herein are intended to encompass a computer program accessible from any computer readable device or media.

Of course, those skilled in the art will recognize that any combination of the above components, or any number of different components, peripherals, and other devices, may be used with the computer 1002.

Although the term "computer" is referred to herein, it is understood that the computer may include portable devices such as cellphones, portable MP3 players, video game consoles, notebook computers, pocket computers, or any other device with suitable processing, communication, and input/output capability.

CONCLUSION

This concludes the description of the preferred embodiments of the present invention. The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for time stamping a retrieved version of a media program, comprising the steps of:
   receiving a media program in a receiver remote from a headend, the media program having a first watermark including a time stamp describing a media program temporal datum to a first temporal resolution;
   storing the media program;
   retrieving the stored media program;
   reading the first time stamp of the first watermark of the retrieved media program;
   computing a second time stamp from the temporal difference between a time at which the media program is retrieved from storage and the media program temporal datum, the second time stamp having a second temporal resolution greater than the first temporal resolution;
   generating a second watermark having the second time stamp;
   embedding the second watermark in the retrieved media program; and
   providing the media program and the embedded second watermark to a device external to the receiver.

2. The method of claim 1, wherein the second watermark further comprises a receiver unique identifier, and the method further comprises the steps of:
   recovering the second watermark from the media program;
   determining the second time stamp;
   identifying the receiver from the receiver unique identifier, the second time stamp, and the media program temporal datum.

3. The method of claim 1, wherein the media program temporal datum describes the time the media program was first available for reception and download.

4. The method of claim 3, wherein the time the media program was first available for reception and download is described with respect to a global temporal datum.

5. The method of claim 4, wherein the first time stamp includes a count of n time periods after the global temporal datum.

6. The method of claim 4, wherein the second time stamp comprises at least k bits wherein:

$$k = \text{int}\left[\frac{\log\left(\frac{T_{theatrical}}{R}\right)}{\log(2)}\right] + 1$$

wherein $T_{theatrical}$ is a theatrical release period of the media program and R is the second temporal resolution.

7. The method of claim 4, wherein the second time stamp includes a count of m time periods after the first time stamp.

8. An apparatus for time stamping a retrieved version of a media program, comprising:
   means for receiving a media program in a receiver remote from a headend, the media program having a first watermark including a time stamp describing a media program temporal datum to a first temporal resolution;
   means for storing the media program;
   means for retrieving the stored media program;
   means for reading the first time stamp of the first watermark of the retrieved media program;
   means for computing a second time stamp from the temporal difference between a time at which the media program is retrieved from storage and the media program temporal datum, the second time stamp having a second temporal resolution greater than the first temporal resolution;
   means for generating a second watermark having the second time stamp;
   means for embedding the second watermark in the retrieved media program; and
   means for providing the media program and the embedded second watermark to a device external to the receiver.

9. The apparatus of claim 8, wherein the second watermark further comprises a receiver unique identifier, and the apparatus further comprises:

means for recovering the second watermark from the media program;

means for determining the second time stamp; and means for identifying the receiver from the receiver unique identifier, the second time stamp, and the media program temporal datum.

10. The apparatus of claim 8, wherein the media program temporal datum describes the time the media program was first available for reception and download.

11. The apparatus of claim 10, wherein the time the media program was first available for reception and download is described with respect to a global temporal datum.

12. The apparatus of claim 11, wherein the first time stamp includes a count of n time periods after the global temporal datum.

13. The apparatus of claim 12, wherein the second time stamp comprises at least k bits wherein:

$$k = \text{int}\left[\frac{\log\left(\frac{T_{theatrical}}{R}\right)}{\log(2)}\right] + 1$$

wherein $T_{theatrical}$ is a theatrical release period of the media program and R is the second temporal resolution.

14. The apparatus of claim 12, wherein the second time stamp includes a count of m time periods after the first time stamp.

15. A system for time stamping a retrieved version of a media program, comprising:

a receiver, comprising:

a tuner for receiving a media program in a receiver remote from a headend disposed remotely from the receiver, the media program having a first watermark including a time stamp describing a media program temporal datum to a first temporal resolution;

a video storage device for storing the media program in the receiver and for retrieving the stored media program;

a watermark module, for reading the first time stamp of the first watermark of the retrieved media program, for computing a second time stamp from the temporal difference between a time that the stored media program is retrieved from storage and the media program temporal datum, the second time stamp having a second temporal resolution greater than the first temporal resolution, for generating a second watermark having the second time stamp, and for embedding the second watermark in the retrieved media program; and means for providing the media program and the embedded second watermark to a device external to the receiver.

16. The system of claim 15, wherein the second watermark further comprises a receiver unique identifier, and the system further comprises:

a watermark analysis module for determining the receiver providing the media program, the watermark analysis module comprising:

a first module for recovering the second watermark from the media program;

a second module for determining the second time stamp; and a third module for identifying the receiver from the receiver unique identifier, the second time stamp, and the media program temporal datum.

17. The system of claim 15, wherein the media program temporal datum describes the time the media program was first available for reception and download.

18. The system of claim 17, wherein the time the media program was first available for reception and download is described with respect to a global temporal datum.

19. The system of claim 18, wherein the first time stamp includes a count of n time periods after the global temporal datum.

20. The system of claim 19, wherein the second time stamp comprises at least k bits wherein:

$$k = \text{int}\left[\frac{\log\left(\frac{T_{theatrical}}{R}\right)}{\log(2)}\right] + 1$$

wherein $T_{theatrical}$ is a theatrical release period of the media program and R is the second temporal resolution.

21. The system of claim 19, wherein the second time stamp includes a count of m time periods after the first time stamp.

* * * * *